Nov. 6, 1956
N. B. SAUNDERS
2,769,925
MAGNETIC STEPPING SWITCHES
Filed March 2, 1953
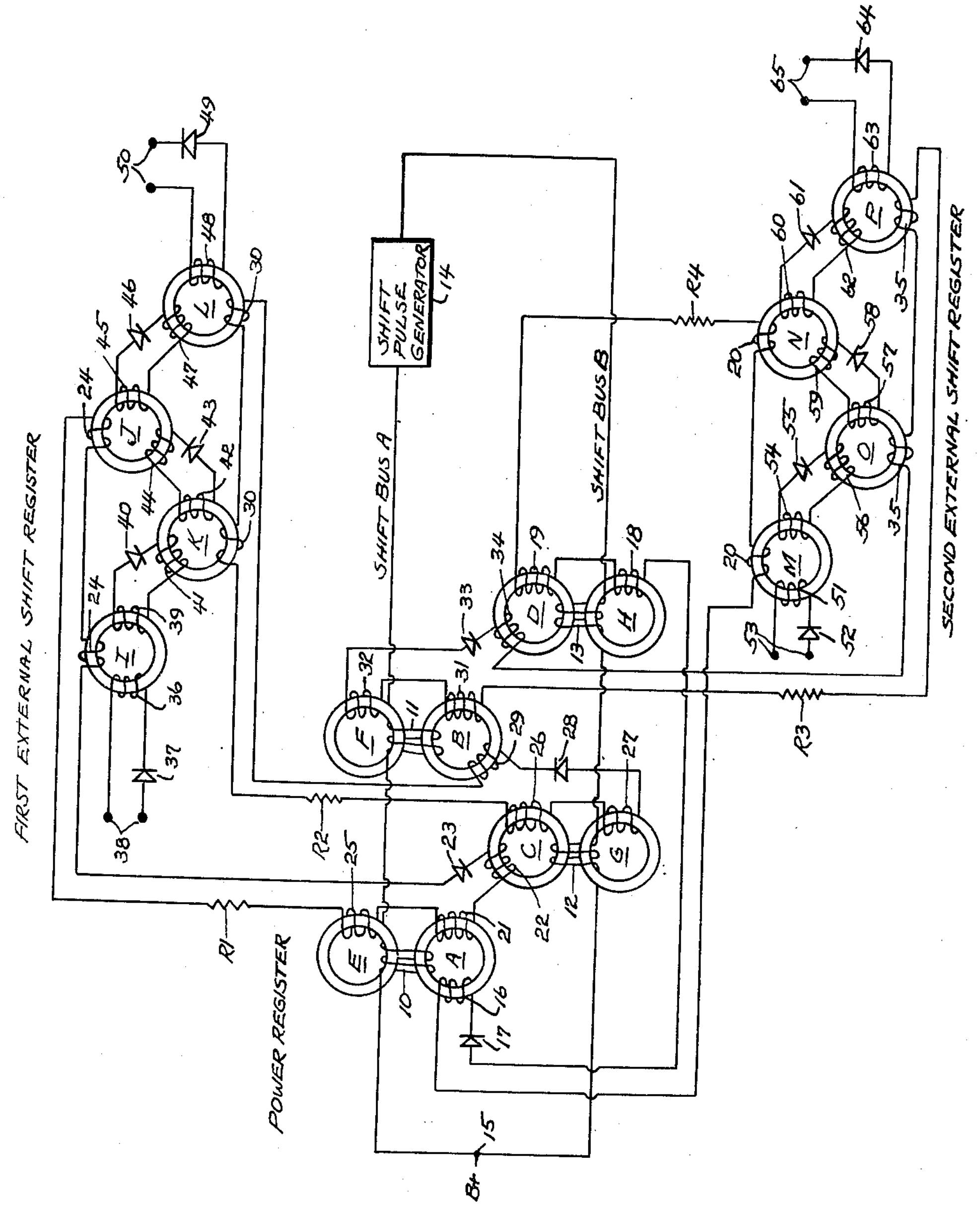
INVENTOR.
NORMAN B. SAUNDERS
BY Robert T. Palmer
ATTORNEY 2,769,925
Patented Nov. 6, 1956

2,769,925

MAGNETIC STEPPING SWITCHES

Norman B. Saunders, Weston, Mass., assignor to American Machine & Foundry Company, a corporation of New Jersey Application March 2, 1953, Serial No. 339,883

20 Claims. (Cl. 307—88)

This invention relates to magnetic memory and switching circuits, and has as objects to reduce the number of components required in such circuits, and to reduce the power required to operate such circuits.

A magnetic binary calculator may use a large number of magnetic binary shift registers such as are described in an article by An Wang and Way Dong Woo on pages 49–54 of volume 21, the January 1950 issue of the Journal of Applied Physics. Such shift registers employ magnetic binaries which are circuit elements including magnetic cores having rectangular hysteresis loops of low coercive force, and having shift, input and output windings on the cores.

When such a core is energized until the magnetizing force saturates it, the residual flux remaining upon removal of the saturating field has a flux density $B_r$. If the core is saturated in the opposite direction, the residual flux remaining upon removal of the saturating field has a flux density $-B_r$. The external magnetomotive force required to shift the core from one stable state to the other is obtained by passing a current pulse through one of its windings. As the core shifts, a voltage is induced in all of its windings. The core can have two states with respect to pulses of a given polarity in a given winding: an active state in which the preceding residual magnetization is opposite in direction to that induced by a pulse, and an inactive state in which the core flux and the induced flux direction are the same.

The output voltage is a function of the rate of change of flux so that there are two types of voltages read into or out of a core depending upon whether or not there is a net change of magnetic state after a current pulse has been applied. When a core is shifted from its inactive state with flux density $B_r$ to saturation with flux density $B_s$ in the same direction, a small voltage pulse called a "zero" pulse is induced across a sensing winding, the time interval of this pulse being proportional to the flux change between $B_r$ and $B_s$ which ordinarily is relatively small. Nevertheless, a "zero" pulse may have sufficient amplitude to be mistaken for the "one" pulse which results from the shifting of the core from its active to its inactive state.

A core in the active state is said to contain the binary digit "one," and a core in the inactive state is said to contain the digit "zero."

A magnetic binary shift register has a line of storage cores and another line of temporary storage cores. If a "one" is stored in the first storage core, the application of a shift current pulse to the line of storage cores will cause sufficient voltage to be induced in the output winding of the first storage core and supplied to the input winding of the first temporary storage core to cause the "one" to be transferred to the first temporary storage core. The application of a shift pulse to the line of temporary storage cores will cause the "one" to be transferred to the second storage core, and so on. One cycle of operation thus consists of pulsing first the line of storage cores, and then the line of temporary storage cores. At the end of each cycle the "one" has been advanced one stage.

In the past each shift register of the large number of shift registers employed in a magnetic binary calculator, has required a separate shift pulse generator including vacuum tubes and associated components.

This invention uses a magnetic binary shift register to shift power to each of several external loads, and which has a very high ratio of transmitted power to exciting power. Excess power over that required to shift a core of the register is available to do work in an external load. Such loads may be the shift busses of other magnetic binary shift registers or other magnetic binary devices such as the logical circuits of computers.

In one embodiment of this invention, a magnetic binary shift register used as a power shift register, has a very high ratio of transmitted power to exciting power for each of its binaries. The output windings of the cores of each stage of this register are connected to the shift busses of an external magnetic binary shift register. As a "one" is shifted through the power register each of its stages supplies shift current pulses to its associated external shift register.

An increase in the ratio of transmitted power to exciting power increases the amplitude of the "zero" voltages which ordinarily would limit the amount of transmitted power which could be used. A feature of this invention is that means is provided for reducing the "zero" voltages, which means in one embodiment of the invention, comprises bucking binary cores with output windings which add bucking "zero" voltages of opposite polarity to the "zero" voltages in the output windings of the storage and temporary storage cores of the power register, thereby balancing-out the "zero" voltages.

Another object of this invention is to use a magnetic binary shift register to switch power to external loads in a predetermined order.

Another object of this invention is to use a magnetic binary shift register to supply shift current pulses to the magnetic binaries of magnetic memory circuits.

Another object of this invention is to use a magnetic binary shift register to supply shift current pulses to the magnetic binaries of other magnetic binary shift registers.

Another object of this invention is to use a magnetic binary shift register as a magnetic stepping switch.

This invention will now be described with reference to the drawing which is a circuit schematic of one embodiment of the invention.

The power shift register comprises a line of storage cores A and B, and a line of temporary storage cores C and D. The cores A and C form the first stage of the register, and the cores B and D form the second stage of the register.

The bucking cores E, F, G and H are associated with the cores A, B, C and D respectively.

A first external shift register has the line of storage cores I and J, and has the line of temporary storage cores K and L.

A second external shift register has the line of storage cores M and N, and has the line of temporary storage cores O and P.

The cores A and E have the common shift winding 10, and the cores B and F have the common shift winding 11. The cores C and G have the common shift winding 12, and the cores D and H have the common shift winding 13.

The shift windings 10 and 11 are connected in series to the shift bus A of a conventional shift pulse generator 14. The shift windings 12 and 13 are connected in series to the shift bus B of the generator 14. The shift busses A and B are connected together at 15 and to B+ for supplying anode voltage to the vacuum tubes used in the generator.

The generator 14 operates in the usual manner, supplying shift current pulses first through the shift bus A, and then through the shift bus B, and so on.

The first storage core A of the power register has an input winding 16 connected in series with the diode 17, the output winding 18 of the bucking core H, the output winding 19 of the temporary storage core D, the resistor R4 and the shift windings 20 of the storage cores M and N of the second external shift register.

The core A has an output winding 21 connected in series with the input winding 22 on the core C, the diode 23, the shift windings 24 on the storage cores I and J of the first external shift register, the resistor R1 and the output winding 25 on the bucking core E.

The core C has an output winding 26 connected in series with the output winding 27 on the bucking core G, the diode 28, the input winding 29 of the core B, the shift windings 30 on the cores K and L of the first external shift register, and the resistor R2.

The core B has an output winding 31 connected in series with the output winding 32 on the bucking core F, the diode 33, the input winding 34 on the core D, the shift windings 35 on the cores O and P of the second external shift register, and the resistor R3.

The first storage core I of the first external shift register has an input winding 36 connected in series with the diode 37 to the input connections 38. The core I has an output winding 39 connected in series with the diode 40 to the input winding 41 on the core K. The core K has an output winding 42 connected in series with the diode 43 to the input winding 44 on the core J. The core J has an output winding 45 connected in series with the diode 46 to the input winding 47 on the core L. The core L has an output winding 48 connected in series with the diode 49 to the output connections 50 which may be the connections to the next storage core in order when more than two stages are used in the first external shift register.

The first storage core M of the second external shift register has an input winding 51 connected in series with the diode 52 to the input connections 53. The core M has an output winding 54 connected in series with the diode 55 to the input winding 56 on the core O. The core O has an output winding 57 connected in series with the diode 58 to the input winding 59 on the core N. The core N has an output winding 60 connected in series with the diode 61 to the input winding 62 on the core P. The core P has an output winding 63 connected in series with the diode 64 to the output connections 65 which may be the connections to the next storage core in order when more than two stages are used in the second external shift register.

The output windings 21, 26, 31 and 19 on the cores A, C, B and D respectively, of the power register, would have more turns than ordinarily are provided, for providing not only the power for shifting the cores of the power register but for providing shift current pulses to the external shift registers. Likewise the power cores would contain more iron than usual.

*Operation*

In operation, assuming a "one" has been inserted in the first storage core A of the power register, with its other cores inactive, the application of a shift pulse from the generator 14 through the shift bus A and the shift winding 10 of the storage core A and its associated bucking core E, will cause the core A to shift from its active to its inactive state, causing a voltage to be induced in its output winding 21 which applied across the input winding 22 of the first temporary storage core C of the power register, causes the core C to be shifted from its inactive to its active state, with the "one" shifted from the core A to the core C. At this time through the series connecion of the shift windings 24 of the storage cores I and J of the first external shift register, a shift current pulse is applied through the shift windings 24, causing any information stored in the cores I and J to be shifted into the cores K and L respectively.

At this time the bucking core E plays no important part since the voltage induced in the output winding 21 of the core A is a "one" voltage.

At this time the core B is in its inactive state so that a "zero" voltage is induced in its output winging 31 and caused by the shift current pulse applied to the shift winding 11 through the shift bus A. However, a similar "zero" voltage opposite in polarity, is induced in the output winding 32 of the bucking core F so that the two "zero" voltages balance out. As a result there is no spurious "one" voltage read into the input winding 34 of the core D, and no spurious shift pulse is applied to the shift windings 35 on the cores O and P.

Next, the generator 14 supplies a shift pulse through the shift bus B to the shift winding 12 of the first temporary storage core C and its associated bucking core G, causing the "one" to be shifted into the second storage core B, and causing a shift current pulse to be supplied to the shift windings 30 of the cores K and L.

At this time a "zero" voltage would be induced in the output winding 19 of the core D as a result of the shift current pulse applied through the shift bus B to the shift winding 13, but this "zero" voltage is cancelled out by an equal and opposite "zero" voltage induced in the series connected output winding 18 on the bucking core H. As a result there is no spurious "one" voltage read into the input winding 16 on the core A, and no spurious shift pulse is applied to the cores M and N.

Next, the generator 14 supplies a shift pulse through the shift bus A to the shift winding 11 of the second storage core B, causing the "one" to be shifted from the core B into the core D, and causing a shift current pulse to be applied to the shift windings 35 of the cores O and P, causing any information stored in these cores to be shifted into the corresponding cores M and N.

At this time, a "zero" voltage would be induced in the output winding 21 of the core A as a result of the shift current pulse applied through the shift bus A to the shift winding 10, but this voltage would be cancelled by an equal and opposite "zero" voltage induced in the output winding 25 of the bucking core E so that there could be no spurious "one" voltage to shift the core A of the power register or the cores I and J of the first external shift register.

Next, the generator 14 supplies a shift current pulse through the shift bus B to the shift winding 13 of the core D, causing the "one" to be shifted from the core D back into the core A of the power register, and causing a shift current pulse to be applied to the shift windings 20 of the cores M and N of the second external shift register.

At this time, a "zero" voltage would be induced in the output winding 26 of the core C as a result of the shift current pulse applied through the shift bus B to the shift winding 12, but this voltage would be cancelled by an equal and opposite voltage induced in the output winding 27 on the bucking core G so that there could be no spurious "one" voltage to shift the core B of the power register or the cores K and L of the first external shift register.

The operation described in the foregoing is repeated, the power shift register recycling and supplying shift current pulses to the external shift registers.

For a varying external load such as a shift bus of another magnetic binary, the impedance looking back into the power register from the external load, should be several times the maximum load impedance. For this reason the resistors R1, R2, R3 and R4 are provided.

The various diodes are provided for preventing current from flowing in the wrong directions.

While for convenience of illustration, only two stages in the power register and in each associated load register, have been illustrated and described, as many stages as are desired can be used. In one successfully operated embodiment of the invention, the power register had fifty cores, each core having as its load twenty cores of an associated calculator. This power register advanced its "one" from one binary to the next every ten microseconds.

A magnetic stepping switch embodying this invention thus operates at speeds many times faster than mechanical stepping switches performing the same functions can operate. It is more economical, both in initial cost and in operating cost than an equivalent vacuum tube device, and is more reliable and trouble free than the latter.

While the cores of the power register have been shown in a closed circuit, they may be operated in an open circuit and receive information from an external source as in ordinary shift register practice. Also they need not be connected as shift registers since they may be magnetic single pulse amplifiers.

In the drawing, the magnetic binaries are shown diagrammatically only. The drawing is not intended to illustrate the constructions of the cores or the physical arrangements of the windings thereon. The proper polarities of the windings and the directions in which they should be wound will be apparent to those skilled in the art.

The invention is not limited, of course, to the exact circuits and components illustrated since modifications thereof may be suggested by those skilled in the art, without departure from the essence of the invention.

What is claimed is:

1. A magnetic stepping switch comprising first and second magnetic cores, shift windings on said cores, means for supplying shift current pulses through said windings, an output winding on said first core, an input winding on said second core, a first electrical load, a first circuit connecting said output winding to said load and to said input winding, an output winding on said second core, a second electrical load, and a second circuit connecting said output winding on said second core to said second load.

2. A magnetic stepping switch as claimed in claim 1 in which the first load is a shift winding on a third magnetic core, and in which the second load is a shift winding on a fourth magnetic core.

3. A magnetic stepping switch as claimed in claim 1 in which the first load is one shift bus of a magnetic binary shift register, and in which the second load is the other shift bus of the shift register.

4. A magnetic stepping switch as claimed in claim 1 in which the circuits include means for producing voltages opposite in polarity to the voltages induced in said output windings when shift current pulses are supplied through said shift windings.

5. A magnetic stepping switch as claimed in claim 4 in which the last mentioned means comprises bucking magnetic cores and output windings on the bucking cores.

6. A magnetic stepping switch as claimed in claim 1 in which the first load is a shift winding on a third magnetic core, in which the second load is a shift winding on a fourth magnetic core, and in which the circuits include means for producing voltages opposite in polarity to the voltages induced in said output windings when shift pulses are supplied through said shift windings.

7. A magnetic stepping switch comprising a plurality of magnetic storage cores, a corresponding plurality of magnetic temporary storage cores, a corresponding plurality of electrical loads, input, output and shift windings on said cores, a shift pulse generator connected to said shift windings, circuits connecting output windings on said storage cores to corresponding loads and to corresponding input windings on said temporary storage cores, and circuits connecting output windings on said temporary storage cores to corresponding loads and to corresponding input windings on said storage cores.

8. A magnetic stepping switch as claimed in claim 7 in which the loads are shift windings on other magnetic cores.

9. A magnetic stepping switch as claimed in claim 7 in which the loads are the shift busses of magnetic binary shift registers.

10. A magnetic stepping switch as claimed in claim 7 in which the circuits include means for producing voltages opposite in polarity to the voltages induced in said output windings when shift pulses are supplied through said shift windings.

11. A magnetic stepping switch as claimed in claim 10 in which the last mentioned means comprises bucking magnetic cores and output windings on the bucking cores.

12. A magnetic stepping switch as claimed in claim 7 in which the loads are the shift busses of magnetic binary shift registers, and the circuits include means for producing voltages opposite in polarity to the voltages induced in the output windings when shift pulses are supplied through the shift windings.

13. A magnetic stepping switch comprising first, second, third and fourth magnetic cores, shift and output windings on said cores, an input winding on the first core, a shift pulse generator connected to said shift windings, first, second, third and fourth electrical loads, a first circuit connecting the output winding on the first core to the first load, a second circuit connecting the output winding on the second core to the second load, a third circuit connecting the output winding on the third core to the third load, and a fourth circuit connecting the output winding on the fourth core to the fourth load and to the input winding on the first core.

14. A magnetic stepping switch as claimed in claim 13 in which the loads are shift windings on other magnetic cores.

15. A magnetic stepping switch as claimed in claim 13 in which the first load is one shift bus of a magnetic binary shift register, in which the second load is the other shift bus of the shift register, in which the third load is one shift bus of a second magnetic binary shift register, and in which the fourth load is the other shift bus of the second shift register.

16. A magnetic stepping switch as claimed in claim 15 in which the circuits include means for producing voltages opposite in polarity to the voltages induced in the output windings when shift pulses are applied to the shift windings.

17. A magnetic stepping switch as claimed in claim 16 in which the last mentioned means includes bucking magnetic cores and output windings on the bucking cores.

18. A magnetic stepping switch comprising a plurality of magnetic cores having output and shift windings thereon, a shift pulse generator connected to said shift windings for shifting said cores in one direction, said cores having input windings thereon for receiving pulses for shifting said cores in the opposite direction, a plurality of electrical loads, means for producing voltages opposite in polarity to the voltages induced in said output windings when shift current pulses from said generator are supplied to said shift windings, and means including said last mentioned means for connecting said output windings to said loads.

19. A magnetic stepping switch as claimed in claim 18 in which the means for producing voltages opposite in polarity comprises a plurality of bucking magnetic cores having shift windings connected to said generator and having output windings connected to said first mentioned output windings and to said loads.

20. A magnetic stepping switch comprising a plurality of magnetic cores having output and shift windings thereon, a shift pulse generator connected to said shift windings for shifting said cores in one direction, said cores having input windings thereon for receiving pulses for shifting said cores in the opposite direction, a plurality of electrical loads, at least one of said loads comprising a plurality of serially connected shift windings for shifting a second plurality of magnetic cores in one direction, said second named cores having input windings thereon for receiving pulses for shifting said cores in the opposite direction, and means for connecting said output windings to said loads.

References Cited in the file of this patent

Publication: Progress Report (2) on the EDVAC; vol. II, published June 30, 1946, Moore School of Electrical Engineering U. of Pa., Phila., Pa., especially parg. 4.2.12 etc., and Figs. 17*a*, *b*, and *c*.

Publication: "Static Magnetic Memory and Switching Circuits," by Jan A. Rajchman, in the June, 1952 issue of the RCA Review.